July 28, 1959 S. D. WILTSE 2,896,976
PIPE COUPLING HAVING MEANS TO PROVIDE FOR
COLD FLOW OF A RESILIENT SLEEVE
Filed July 12, 1954
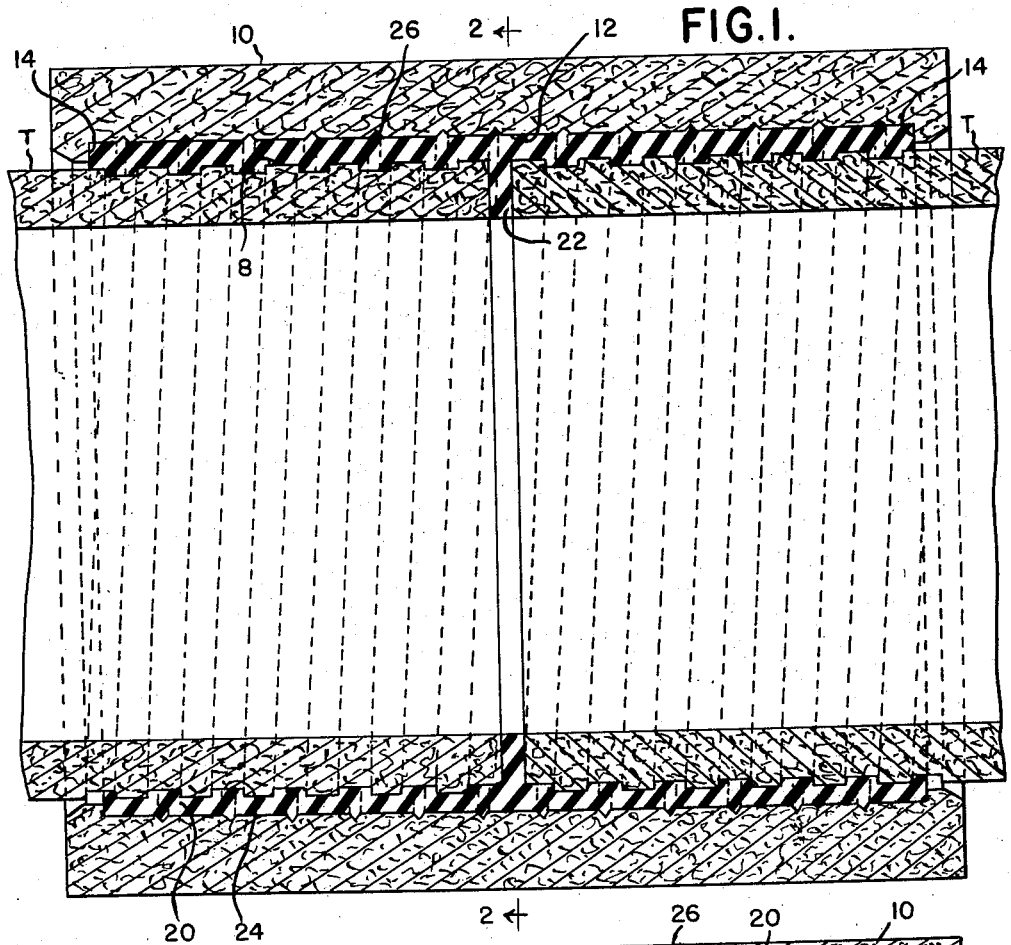
FIG.1.
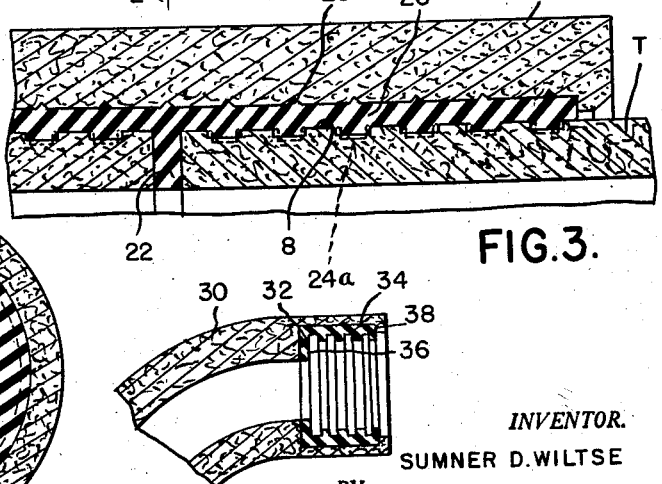
FIG.2.
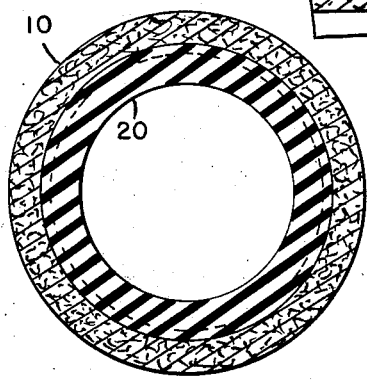
FIG.3.
FIG.4.
INVENTOR.
SUMNER D. WILTSE
BY
ATTORNEYS

United States Patent Office 2,896,976
Patented July 28, 1959

2,896,976

PIPE COUPLING HAVING MEANS TO PROVIDE FOR COLD FLOW OF A RESILIENT SLEEVE

Sumner D. Wiltse, Detroit, Mich.

Application July 12, 1954, Serial No. 442,750

1 Claim. (Cl. 285—230)

The present invention relates to a pipe connection.

It is an object of the present invention to provide means for connecting the ends of pipes characterized by the economy with which it may be produced, the efficiency with which it serves to effect a mechanical connection and seal between the pipes, and the ease and facility with which the pipe connection may be made.

More specifically, it is an object of the present invention to provide a pipe connection comprising a rigid sleeve having a cylindrical opening therethrough provided at its ends with radially inwardly extending abutment flanges, a tubular connector formed of rubber and adapted to fit snugly within the opening in said sleeve with its ends in abutment with the flanges, said tubular connector having internal threads of rectangular cross-section designed to cooperate with corresponding threads provided on the ends of the pipes to be connected, said tubular connector having in addition a sealing and locating flange intermediate its ends and extending radially inwardly thereof.

It is a further object of the present invention to provide a pipe connector comprising a rigid sleeve and a rubber internally threaded connector therein, in which the threads on the rubber connector are shaped to be of greater height but less width than the corresponding threads provided on the ends of the pipes to be connected thereto, so that the internal threads on the tubular rubber connector are distorted as the pipe is screwed into the connector.

It is a further object of the present invention to provide connector means as described in the preceding paragraph in which the sleeve is provided with a relief channel at its interior surface into which rubber material may be displaced when the pipe ends are threaded into the rubber connector.

More specifically, it is an object of the present invention to provide the relief channel in parallelism and registration with the threads on the rubber connector and to provide the channel of V-shape in cross-section.

It is a further object of the present invention to provide connector means of the character described in which the rubber connector may be cemented within the sleeve and in which the pipe ends may be both threaded and cemented in place so as to produce a permanent joint or connection.

Other objects and features of the invention will become apparent as the description proceeds, especially when taken in conjunction with the accompanying drawings, wherein:

Figure 1 is a fragmentary longitudinal sectional view through a pipe connection produced in accordance with the present invention.

Figure 2 is a sectional view on a much reduced scale, taken on the line 2—2, Figure 1.

Figure 3 is a fragmentary sectional view showing the relative form of threads before assembly.

Figure 4 is a diagrammatic view illustrating the application of the present invention to angular fittings.

In Figure 1 there is shown the ends of two pipes or tubes T which may be formed of any suitable solid material such for example as asbestos cement, plastic, cement, ceramic, metal, tile, etc. The ends of the tube T are provided with threads 8, the form of the threads being rectangular in cross-section and as illustrated in the figures, the threads on the ends of the tubes are of a width equal to the space between adjacent turns of the thread. Also, the threads are relatively shallow having a height approximately one-fourth of the width of the thread section. Threads of this configuration are most readily provided on non-metallic pipes, and the invention is thus particularly useful as applied thereto.

A sleeve 10, which may be formed of any suitable rigid material as for example the same material or that employed in making the pipes or tubes T, is provided. The sleeve is generally cylindrical in configuration and is provided with a generally cylindrical opening 12 extending therethrough and provided at its ends with short radially inwardly extending abutment flanges 14 for a purpose which will presently be described.

Received within the cylindrical portion of the opening 12 is a thin walled tubular rubber connector 20. The wall thickness from outside diameter to major internal thread diameter is preferably between 0.10 and 0.20 inch. The rubber connector may be formed of natural or synthetic rubber such for example as neoprene, and will be suitably compounded to produce physical characteristics as required. Preferably, the rubber has a durometer hardness of 55 plus or minus 5, a tensile strength of 2000 pounds per square inch, and an elongation of 300% and a permanent set of 25%. The tubular rubber connector will appear relatively soft and may be easily collapsed for insertion into the sleeve and yet when reinserted in the sleeve in the relationship illustrated in the figures, it provides a connector element of exceptional and surprising strength and serves to effect both a mechanical connection and an efficient fluid-tight seal.

Intermediate the ends of the tubular connector 20 is provided a circular radially inwardly extending locating and sealing flange 22 which is adapted to be engaged between the ends of the pipes or tubes T. The interior surface of the tubular connector 20 is provided with threads 24 adapted to cooperate with the threads 8 formed on the exterior of the pipes or tubes T at the ends thereof.

The internal threads 24 of the tubular connector 20 may be of the same shape and size as the external threads 8 formed at the ends of the tubes T, but so dimensioned as to provide a fairly tight fit when the tube ends are fitted into the ends of the tubular connector after the tubular connector has been inserted in the sleeve 10.

As is well known, rubber and rubber compounds while they may be highly elastic and resilient, are substantially incompressible under normal conditions and in order to accommodate displacement of rubber from the tubular connector 20, the interior surface of the sleeve 10 is provided with a relief channel 26 which is preferably helical and extends at the same lead as the threads 24 provided in the tubular connector. Moreover, the tubular connector is preferably inserted in the sleeve in such a way that the helical relief channel 26 lies directly in back of the thread 24 throughout the extent thereof. Accordingly, as the ends of the pipes or tubes T are forced into threaded relation in the tubular connector 20, the rubber material of the tubular connector may be displaced into the relief channel.

It may be mentioned at this time that the tubular connector 20 may be inserted in the sleeve 10 by doubling the connector longitudinally and inserting it into the opening in the sleeve and then letting it spring into its normal cylindrical shape. If desired, the tubular connector may be cemented in the sleeve so as to become in effect a permanent part thereof. In like manner, if desired, the ends of the pipes or tubes T may be provided with an adhesive prior to screwing them into the coupling, in which case a permanent joint will be produced which cannot be disconnected without destruction. Alternatively, of course, if adhesive is omitted from the ends of the pipes or tubes, the joint or coupling may be made and broken repeatedly as desired.

Referring now to Figure 3 there is illustrated a preferred relationship between the internal threads 24 of the tubular conductor 20 and the threads 8 formed on the exterior of the pipes or tubes T. In this figure in dotted lines as indicated by the reference numeral 24a there is illustrated the shape and relative size of the threads 24 of the tubular connector. It will be observed that these threads are relatively higher than the grooves between adjacent threads 8 on the tubes T. At the same time the threads 24 in their unstressed condition are of less width than the width between adjacent threads 8 on the pipe T. Accordingly, as the pipe is threaded into the tubular connector while the connector is retained in position in the sleeve 10 substantial distortion of the threads 24a takes place causing the threads 24a to conform to and to fill the space between the threads 8 on the pipe, thus assuming the shape and dimensions indicated at 24 in Figure 1. At the same time, in the event that excess material is present in the material of the thread 24a, the relief channel 26 is provided in the inner surface of the sleeve 10 to receive material displaced from the tubular connector.

In the assembly the sealing and locating flange 22 acts as an abutting and positioning element that locates the ends of the tubes or pipes T relative to the connector 20 and the sleeve 10. The flange 22 is subjected to thrust pressures in threaded assemblies and is deformed into tight sealing engagement with the ends of the tubes.

The sleeve and tubular connector are so dimensioned with respect to the pipe that when the assembly is completed the tube or pipe ends subject the rubber connector to compressive forces sufficient to distort the connector and to cause it to substantially fill the chamber between the sleeve and the pipe, and particularly, to distort the threads of the tubular rubber connector to conform under pressure to the spaces between the threads on the pipe and also to some extent into the relief channel 26. The compressive forces developed cause the connector to press tightly against the mating surfaces of the tube ends and the internal mating surfaces of the sleeve, thereby establishing a flexible fluid-tight connection that greatly resists end pull or end thrust.

The oppositely disposed tube or pipe ends when tightened into assembly with the connector develop considerable pressure upon the locating flange 22 and threaded sections of the connector, thus causing the connector and its locating flange 22 to press tightly against the sleeve 10 and the ends of the tubes or pipes T and thus to resist endwise movement of the tubes or pipes relative to the connector and sleeve. The tubular rubber connector 20 is under compression and establishes a positive fluid seal, and also resists end thrust or pull due to the fact that the stressed threaded sections of the tubular connector are in combined compression and shear.

As a specific example, for a four inch internal diameter pipe of the type illustrated, which may be formed of asbestos and cement, the tubular connector 20 is provided with about six turns of a relatively coarse pitch single start thread at opposite sides of the central locating flange 22. These threads at each side of the locating flange 22 have a total shear length of about 92 linear inches. At 100 pounds per square inch within the tube system there is thus about 13.6 pounds shear load per linear inch of thread.

It will be noted that in the assembled joint there is a smooth continuous inner surface formed by the inside of the pipe or tube sections and the inner surface of the locating flange 22, thus eliminating any voids at the joint that might trap material and also avoiding any projections into the path of flow.

While the connection illustrated is for connecting two straight sections of pipe together, it will of course be obvious that the connectors may be made in any of the common shapes or bends, such as 15, 30, 45, 60 and 90-degree elbows, in which case the sleeve 30 will include a radial surface 32 and the tubular connector 34 will be provided with a flange 36 corresponding to the flange 22 at the inner end thereof which will abut against the radial surface 32 of the sleeve 30. The tubular connector 34 is retained in the sleeve 30 by a flange 38 at the end of the sleeve. This arrangement is diagrammatically illustrated in Figure 4.

The drawings and the foregoing specification constitute a description of the improved pipe connection in such full, clear, concise and exact terms as to enable any person skilled in the art to practice the invention, the scope of which is indicated by the appended claim.

What I claim as my invention is:

Structure for coupling two rigid non-metallic pipes, the adjacent ends of said pipes each having formed thereon coarse external rectangular helical threads, a rigid tubular sleeve having at each end an inwardly extending abutment flange, and a tubular soft rubber connector fitted snugly within said sleeve, the ends of said connector abutting said flanges, said connector having intermediate its ends an integral radially extending annular locating and sealing flange adapted to be engaged by said pipe ends, said connector having internal threads extending from its ends to said sealing flange, said internal threads being higher and narrower than the thread grooves in said pipes, said grooves and internal threads having the same pitch, the interior surface of said sleeve having a helical V-shaped relief channel therein concentric to and in radial alignment with the threads in said connector, whereby when said connector and pipes are screwed into coupling relation said higher connector threads are distorted and said relief channel will receive displaced connector material.

References Cited in the file of this patent

UNITED STATES PATENTS

| | | |
|---|---|---|
| 566,136 | Caldwell | Aug. 18, 1896 |
| 912,944 | Duff | Feb. 16, 1908 |
| 1,324,046 | Hatfield | Dec. 9, 1919 |
| 1,378,015 | Erickson | May 17, 1921 |
| 1,756,167 | Avery | Apr. 29, 1930 |
| 2,034,423 | Shrum | Mar. 17, 1936 |
| 2,061,151 | Gunderman | Nov. 17, 1936 |
| 2,110,096 | Scholtes | Mar. 1, 1938 |
| 2,366,067 | Smith | Dec. 26, 1944 |
| 2,437,843 | Van Ness | Mar. 16, 1948 |

FOREIGN PATENTS

| | | |
|---|---|---|
| 104,877 | Australia | Aug. 19, 1938 |
| 679,581 | Great Britain | Sept. 17, 1952 |